United States Patent [19]

Snell

[11] Patent Number: 5,382,065
[45] Date of Patent: Jan. 17, 1995

[54] COMPOST CUTTING AND STIRRING APPARATUS

[76] Inventor: John R. Snell, 918 Rosewood Ave., East Lansing, Mich. 48823

[21] Appl. No.: 130,693

[22] Filed: Oct. 4, 1993

[51] Int. Cl.⁶ ............................................. A01B 1/02
[52] U.S. Cl. .................................... 294/53.5; 294/51; 294/59
[58] Field of Search ................. 294/49, 50.6, 51, 53.5, 294/55, 56, 59; 7/114, 116; 30/123, 340, 342; 47/1.01; 172/13, 371, 372, 375, 381; 366/342, 343; 403/92, 91, 103

[56] References Cited

U.S. PATENT DOCUMENTS

| | | | |
|---|---|---|---|
| 819,181 | 5/1906 | Stenstrom | 294/51 |
| 881,782 | 3/1908 | Elliott | 294/51 |
| 1,344,256 | 6/1920 | Blackman | 294/51 |
| 1,478,204 | 12/1923 | Cooney et al. | 294/51 |
| 2,169,557 | 8/1939 | Curtiss | 172/375 X |
| 2,251,048 | 7/1941 | Garland | 172/375 X |
| 2,771,019 | 11/1956 | Zeitz | 172/372 |
| 4,247,141 | 1/1981 | Grint | 294/49 |
| 5,263,253 | 11/1993 | Sainsbury | 294/49 X |

FOREIGN PATENT DOCUMENTS

| | | | |
|---|---|---|---|
| 92531 | 5/1923 | Austria | 294/53.5 |
| 157768 | 2/1957 | Sweden | 294/53.5 |

*Primary Examiner*—Johnny D. Cherry
*Attorney, Agent, or Firm*—E. Michael Combs

[57] ABSTRACT

A spade-like member includes an elongate shaft pivotally mounted to a blade member that is formed of a generally triangular configuration, with the support shaft arranged for selective latching to the shaft permitting the shaft and the blade member to project into a compost pile, whereupon lifting of the blade member rotates the blade member ninety degrees relative to the shaft to permit lifting of the blade and stirring of the compost, wherein the blade is maintained in the rotated orientation by an abutment member mounted to the blade.

7 Claims, 4 Drawing Sheets

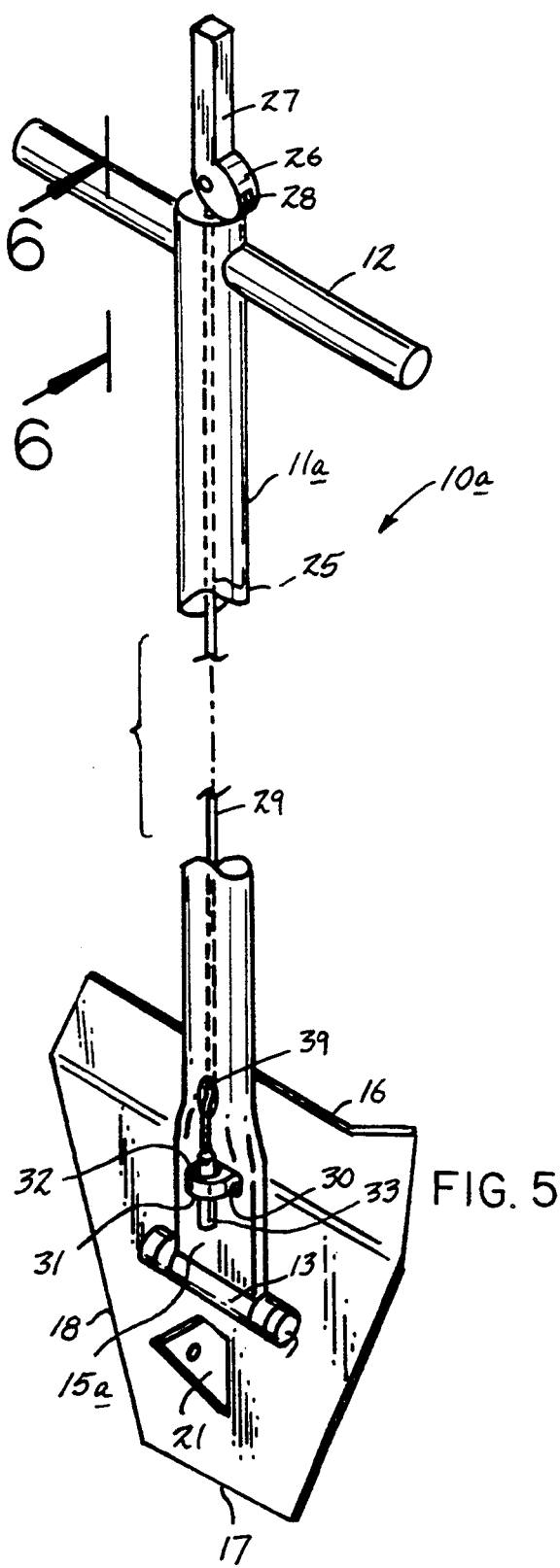
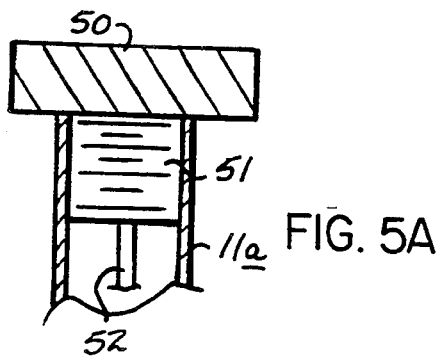
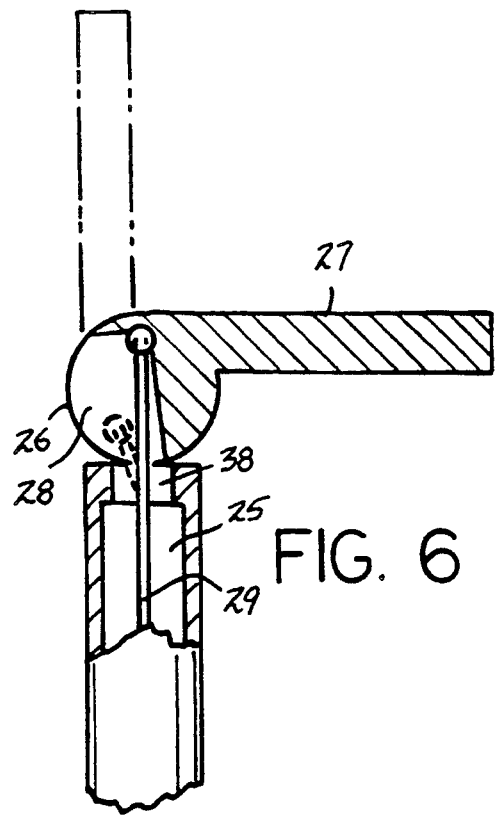
FIG. 5
FIG. 5A
FIG. 6

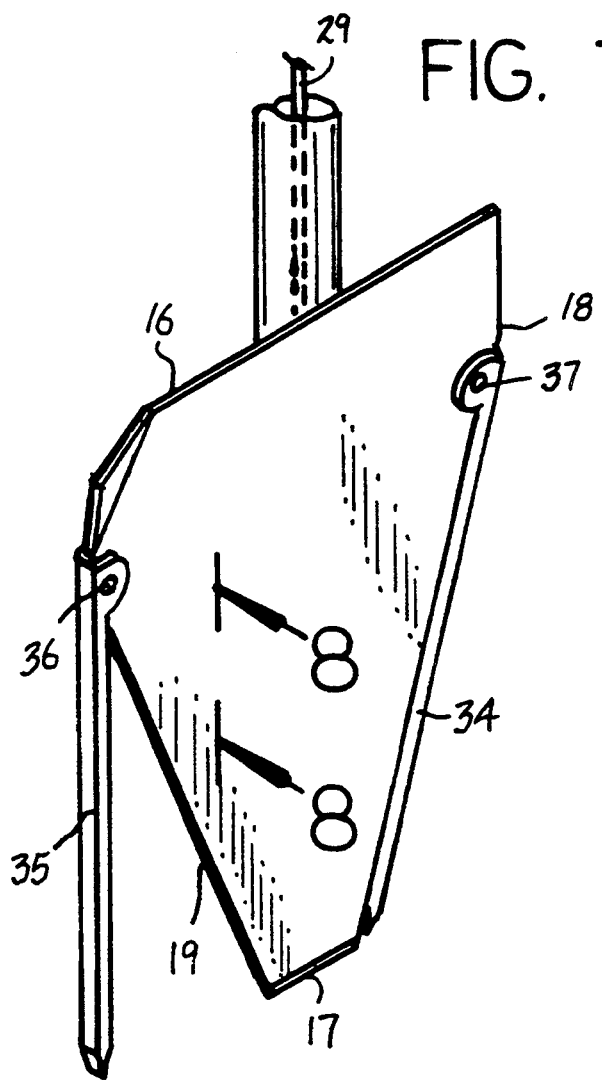
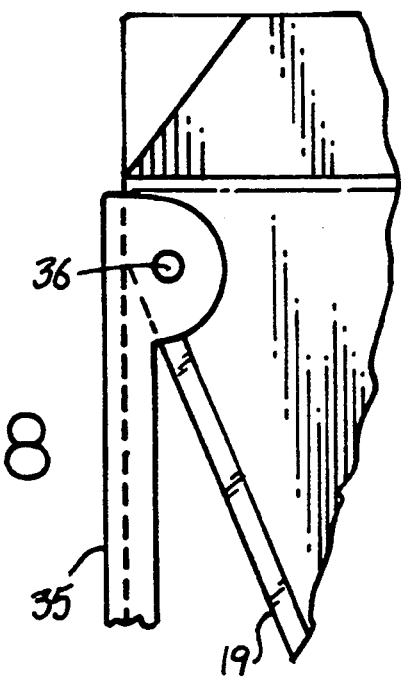

COMPOST CUTTING AND STIRRING APPARATUS

BACKGROUND OF THE INVENTION

1. Field of the Invention

The field of invention relates to shovel construction, and more particularly pertains to anew and improved compost cutting and stirring apparatus wherein the same is arranged to permit a blade member to be projected within a compost pile and effect pivoting of the blade member permitting lifting of the compost in a stirring manner.

2. Description of the Prior Art

The stirring of compost is typically effected by the use of elaborate apparatus or alternatively, of pitchfork-like members, wherein conventional shovel construction is not sufficient to provide such stirring inasmuch as the shovel blade is maintained in a generally aligned orientation relative to an associated shaft or handle.

The instant invention attempts to overcome deficiencies of the prior art by providing for a blade member having a triangular configuration employing sharpened cutting edges permitting projection within a compost pile and subsequent tilting or pivoting of the blade member providing for a lifting surface upon manual lifting of the shaft relative to such compost pile.

SUMMARY OF THE INVENTION

In view of the foregoing disadvantages inherent in the known Types of shovel construction now present in the prior art, the present invention provides a compost cutting and stirring apparatus wherein the same is arranged to permit the cutting and subsequent lifting of compost in a stirring manner. As such, the general purpose of the present invention, which will be described subsequently in greater detail, is to provide a new and improved compost cutting and stirring apparatus which has all the advantages of the prior art compost stirring apparatus and none of the disadvantages.

To attain this, the present invention provides a spade-like member including an elongate shaft pivotally mounted to a blade member that is formed of a generally triangular configuration, with the support shaft arranged for selective latching to the shaft permitting the shaft and the blade member to project into a compost pile, whereupon lifting of the blade member rotates the blade member ninety degrees relative to The shaft to permit lifting of the blade and stirring of the compost, wherein the blade is maintained in the rotated orientation by an abutment member mounted to the blade.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description Thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, Therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved compost cutting and stirring apparatus which has all the advantages of the prior art compost stirring apparatus and none of the disadvantages.

It is another object of the present invention to provide a new and improved compost cutting and stirring apparatus which may be easily and efficiently manufactured and marketed.

It is a further object of the present invention to provide a new and improved compost cutting and stirring apparatus which is of a durable and reliable construction.

An even further object of the present invention is to provide a new and improved compost cutting and stirring apparatus which is susceptible of a low cost of manufacture with regard to both materials and labor, and which accordingly is then susceptible of low prices of sale to the consuming public, Thereby making such compost cutting and stirring apparatus economically available to the buying public.

Still yet another object of the present invention is to provide a new and improved compost cutting and stirring apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is an isometric illustration of a modified aspect of the invention.

FIG. 5A is a cross-sectional illustration of a modified device to reciprocate a control rod within the handle.

FIG. 6 is an orthographic view, taken along the lines 6—6 of FIG. 5 in the direction indicated by the arrows, partially in section.

FIG. 7 is an isometric rear view of the blade member having bar axles mounted to the side edges thereof.

FIG. 8 is an enlarged or orthographic view, taken along the lines 8—8 of FIG. 7 in the direction indicated by the arrows.

DESCRIPTION OF THE PREFERRED EMBODIMENT

Figures 1, 2:
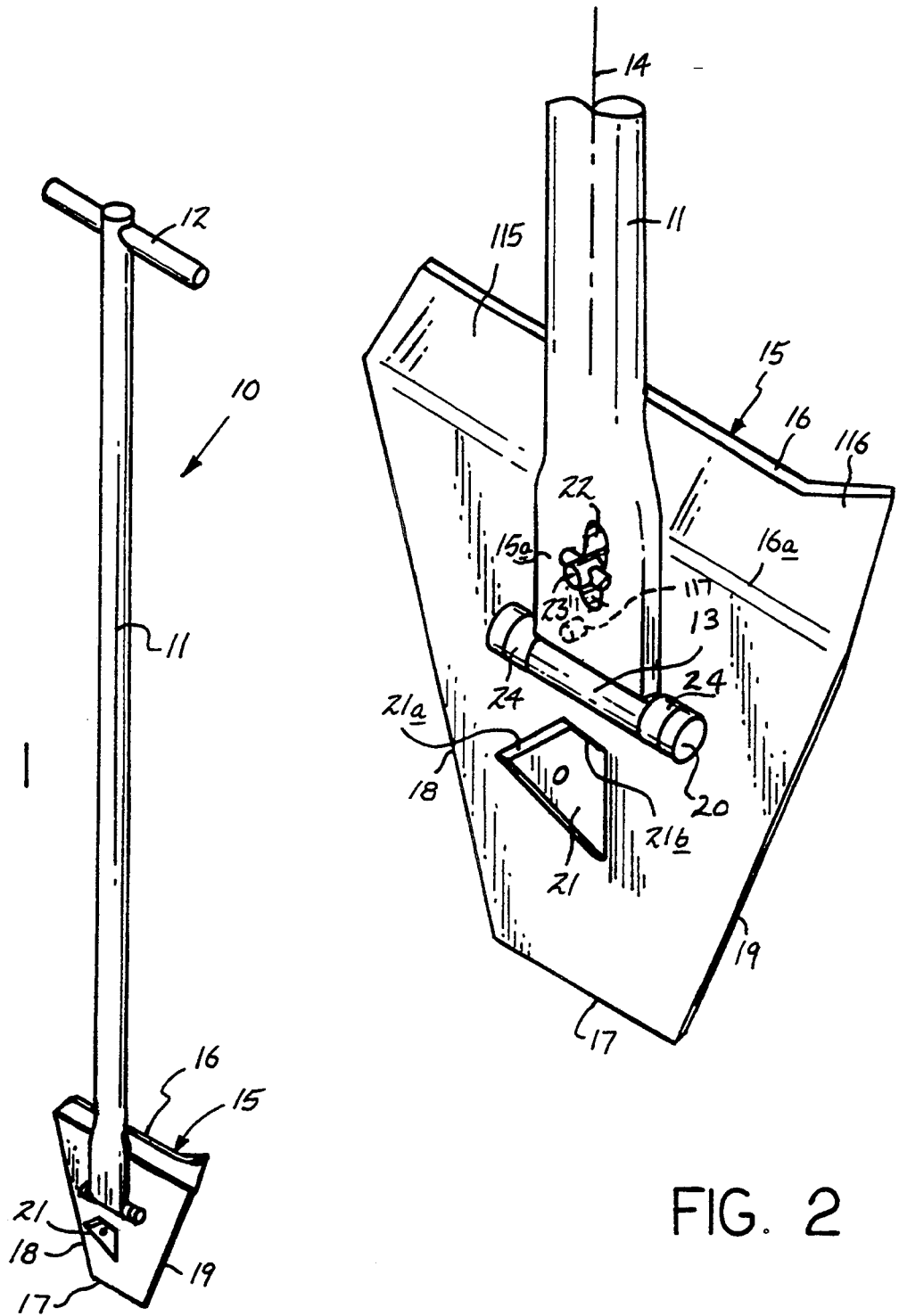
FIG. 1 is an isometric illustration of the invention.
FIG. 2 is an enlarged isometric illustration of the blade member mounted to the shaft.

With reference now to the drawings, and in particular to FIGS. 1 to 8 thereof, a new and improved compost cutting and stirring apparatus embodying the principles and concepts of the present invention and generally designated by the reference numerals 10 and 10a will be described.

More specifically, the compost cutting and stirring apparatus 10 of the instant invention essentially comprises a support shaft 11 symmetrically oriented about a shaft axis 14, having a first end handle 12 fixedly and orthogonally mounted to the support shaft adjacent the shaft first end, with the shaft second end having a second end tube 13 orthogonally oriented relative to the axis and receiving a pivot axle 20 therethrough securing the second end tube 13 to an associated blade member that in turn includes a plurality of axle support loops 24, wherein the axle support loops 24, the pivot axle 20, and the second end tube are coaxially aligned relative to one another. The blade member 15 includes a blade first end edge 16 spaced from and parallel to a blade second end edge 17. The blade member 15 is of a generally truncated triangular configuration, with the blade first and second end edges 16 and 17 arranged parallel relative to one another, with the first end edge having a first length, and the second end edge having a second length less than the first length. First and second side edges 18 and 19 are provided of an equal length and canted towards one another from the first end edge 16 to the second end edge 17. The first and second side edges 1 and 19, as well as the second end edge 17, are of a generally sharpened blade-like construction to permit ease of projection of the blade member 15 within the compost pile "C", of a type as indicated by example in the FIGS. 3 and 4.

Figure 3:
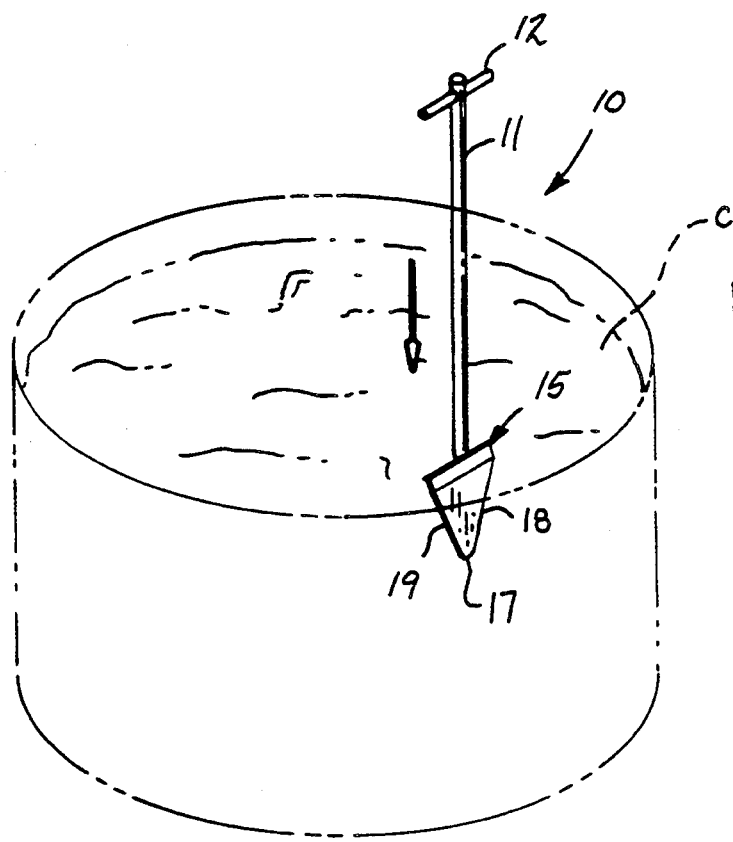
FIG. 3 is an isometric illustration of the apparatus directed into a compost pile.

The blade member 15 includes an upper blade potion 115 that extends from the first edge 16 to an intersection 16a parallel to the first edge 16 and oriented between the tube 13 and the first blade edge 16, such that the upper blade portion 115 cants rearwardly of a forward wall of the blade member 15 to define an obtuse angle between the upper blade portion 115 and the rear wall of the blade member 15. Further, an upper blade portion wing 116 defines an obtuse included angle between the upper blade portion wing 116 and the upper blade portion indicated in FIG. 2. In this manner, upon rotation of the blade structure, limited resistance is provided by the wing 116. Canting of the overlay portion further assists in the lifting and agitation in the use of the blade structure in a compost pile "C", as indicated in the FIG. 4. An abutment block 117 is mounted to the flattened portion 15a of the handle 11, with the abutment block 117 preventing over-tilting of the blade and therefore maintaining the blade 15 in alignment during projection into a compost pile "C", as indicated in FIG. 3.

Figure 4:
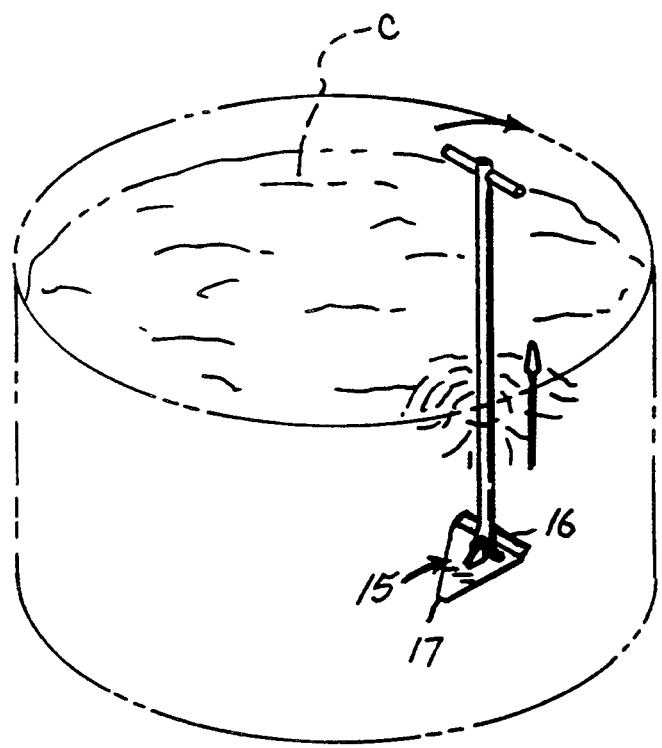
FIG. 4 is an isometric illustration of the invention arranged for lifting relative to the compost pile.

Further, the pivot axle 20 is mounted between the first and second end edges 16 and 17 and spaced from the first end edge 16 a first spacing, and spaced from the second end edge 17 a second spacing less than the first spacing to provide for ease of tilting and promote lifting of the compost when the blade is projected into the compost pile in a first position and tilted ninety degrees relative to the first position in a second position, as illustrated in FIG. 4. The cutting edges of the second end edge 17 and first and second side edges 18 and 19 ease the projection of the blade member within the compost pile "C", as illustrated. An abutment blade 21 is fixedly and orthogonally mounted to the blade member 15, having an abutment wall 21a arranged in a facing relationship orthogonally oriented relative to the pivot axle 20 to provide for an abutment relative to the support shaft 11 to effect maintaining the abutment wall 21a in an orthogonal relationship relative to the blade member 15, wherein the support shaft includes a flattened portion 15a arranged for engagement with the abutment wall 21a, in a manner as indicated in FIG. 4.

An opening or recess 21b is oriented between the abutment wall 21a to provide access and clearance upon pivoting of the blade member 15 about the axle 20.

The blade member 15 is arranged for selective latching in the first position, as indicated in FIG. 2, employing a swivel T-bolt 23 rotatably mounted to the blade member 15 in an orthogonal relationship in adjacency to the first end edge 16, with the swivel T-bolt 23 arranged for reception through a handle slot 22 that is arranged orthogonally oriented relative to the second end tube 3. In this manner, rotation of the swivel T-bolt 23 aligning the handle of the T-bolt with the handle slot 22 permits the shaft 11 to displace relative to the blade member, in a manner as indicated in FIG. 4, from the orientation as indicated in FIG. 3.

The apparatus 10a, as indicated in FIGS. 5 and 6, further includes a manner of unlocking the blade member once the blade member is projected within the compost pile "C". To This end, a guide bore 2 is directed through the modified support shaft 11a, as indicated in FIG. 5, having a shaft first end opening 38 directed through the first end of the support shaft, with a shaft second end opening 39 projecting through the shaft in adjacency to and between the flattened portion 15a and the first end. A control cable 29 extends through the guide bore 25 and has a cable first end mounted within a cam roller 26, and more specifically directed through a cam roller slot 28 eccentrically mounted relative to the cam roller 26, with the cam roller 26 having a cam roller handle 27 permitting ease of rotation of the cam roller to the support shaft first end. The control cable extends through the guide bore 25 projecting through the second end opening 39 mounting a guide pin 33 that is received through a guide lug 31, having a guide lug bore 32 slidably receiving the guide pin 33. The modified handle slot 30 in the configuration of the apparatus 10a is oriented parallel relative to the second end tube 13, whereupon displacement of the guide pin 33 relative to the guide lug 31 permits displacement of the guide lug 31 from the modified handle shaft 11a through the modified handle slot 30. It should be further noted that in lieu of the cam roller 26 and handle 27, a handle lug 50 having a coarsely threaded boss 51 as shown in FIG. 5A is threadedly received within an uppermost end of the support shaft 11a, such that ease of reciprocation of a rigid control rod 52 in lieu of the cable 29 is provided.

The control rod provides for a positive reciprocation relative to rotation of the boss 51.

Reference to FIGS. 7 and 8 indicates the use of first and second lever bars 34 and 35 pivotally mounted about respective first and second bar axles 36 and 37 to the blade member 15 in adjacency to the respective first and second side edges 18 and 19. The bar axles 36 and 37 are positioned in adjacency to the first end edge 16 permitting displacement of the bar axles 36 when projected into the compost pile "C", whereupon twigs and the like within the compost pile "C" are captured between the bar axles 36 and associated with first and second side edges 18 and 19 that are sharpened to provide for the severing of such twigs within the compost pile "C".

As to the manner of usage and operation of the instant invention, the same should be apparent from the above disclosure, and accordingly no further discussion relative to the manner of usage and operation of the instant invention hall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A compost cutting and stirring apparatus, comprising,
    a support shaft, the support shaft having a shaft first end spaced from a support shaft second end, and the support shaft symmetrically oriented about a shaft axis, and
    the first end including a first end handle orthogonally oriented relative to the axis, and
    a blade member, the blade member of a generally truncated triangular configuration, including pivot means pivotally mounting the blade member to the shaft second end,
    the blade member includes a first end edge having a first length, a second end edge having a second length less than the first length, and the blade member further including a first side edge and a second side edge, wherein the first side edge and the second side edge are canted towards one another extending from the first end edge to the second end edge, and wherein the second end edge, the first side edge, and the second side edge are of a sharpened blade-like configuration,
    said pivot means includes a second end tube fixedly mounted to the support shaft second end, and the blade member including axle support loops positioned on opposed ends of the second end tube, and a pivot axle directed through the second end tube and the support loops, wherein the pivot axle and the second end tube are oriented between and parallel to the first end edge and the second end edge, the pivot axle is spaced from the first end edge a first spacing, and the pivot axle is spaced from the second end edge a second spacing, wherein the first spacing is greater than the second spacing, and wherein the blade member is pivotal from a first position substantially parallel to the shaft axis to a second position orthogonally oriented relative to the shaft axis, and including an abutment blade fixedly and orthogonally mounted to the blade member, wherein the abutment blade includes an abutment wall orthogonally oriented to the blade member and orthogonally oriented relative to the shaft axis in adjacency to the shaft axis, and wherein the support shaft includes a flattened portion oriented in adjacency relative to the second end for abutment with the abutment wall in the second end position, and said abutment spaced from the blade member to permit reception of said second end tube between the abutment blade and the blade member.

2. An apparatus as set forth in claim 1 including lock means mounted to the blade member extending through the support shaft for selective securement of the blade member to the support shaft in the first position.

3. An apparatus as set forth in claim 2 wherein the lock means includes a swivel T-bolt rotatably and pivotally mounted to the blade member in adjacency to the first end edge, and the support shaft having an elongate slot, wherein the T-bolt is arranged for rotation from a first locked position latching the support shaft to the blade member to a second unlocked position, wherein the T-bolt is arranged for sliding reception through the elongate slot.

4. An apparatus as set forth in claim 2 wherein said blade member includes an upper blade portion, said upper blade portion extending from said first end edge to an intersection, with said intersection oriented parallel to said first end edge, and the blade member having a front surface and a fear surface, with the upper blade portion defining an obtuse included angle between the upper blade portion and the rear surface.

5. An apparatus as set forth in claim 4 wherein the lock means includes a shaft guide bore, wherein the shaft guide bore includes a first end opening directed through the shaft first end, and a second end opening directed through the support shaft in adjacency to the flattened portion between the flattened portion and the shaft first end, and a control cable directed through the guide bore, the control cable having a control cable first end and a cam roller having a cam roller handle mounted to the support shaft first end, and the control cable first end secured eccentrically to the cam roller, and the control cable having a control cable second end extending through the shaft second end opening, and an elongate slot directed through the support shaft between the second end opening and the shaft second end, wherein the slot includes a guide lug slidably received through the slot and the guide lug orthogonally and fixedly mounted to the blade member, the guide lug including a guide lug bore, and the control cable second end including a guide pin, with the guide pin received through the guide lug bore, whereupon rotation of the cam roller handle displaces the guide pin relative to the guide lug bore permitting pivoting of the blade member from the first position to the second position.

6. An apparatus as set forth in claim 5 including a first lever bar pivotally mounted to the first side edge, and a second lever bar pivotally mounted to the second side edge, wherein the first lever bar includes a first bar axle directed through the blade member adjacent the first side edge and the first end edge, and the second lever bar including a second bar axle directed through the blade member adjacent the second side edge and the first end edge permitting pivotal displacement of the first lever bar and the second lever bar from the first side edge and the second side edge, respectively.

7. An apparatus as set forth in claim 6 wherein the upper blade portion includes a wing member extending from said upper blade portion to the second side edge, and the wing member having an obtuse included angle between said wing member and the upper blade portion.

* * * * *